(12) United States Patent
Yu et al.

(10) Patent No.: US 10,900,566 B2
(45) Date of Patent: Jan. 26, 2021

(54) SYSTEMS AND METHODS TO ESTIMATE THE GEAR POSITIONS OF MANUAL TRANSMISSIONS

(71) Applicants: Songping Yu, Troy, MI (US); Omar Elbanna, Auburn Hills, MI (US); Mohamed Othman, Troy, MI (US)

(72) Inventors: Songping Yu, Troy, MI (US); Omar Elbanna, Auburn Hills, MI (US); Mohamed Othman, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/439,181

(22) Filed: Jun. 12, 2019

(65) Prior Publication Data
US 2020/0393044 A1    Dec. 17, 2020

(51) Int. Cl.
*F16H 63/40* (2006.01)
*F16H 61/02* (2006.01)
*B60W 50/00* (2006.01)

(52) U.S. Cl.
CPC .................................. *F16H 63/40* (2013.01)

(58) Field of Classification Search
CPC ................. B60W 50/0097; F16H 3/40; F16H 2061/0216; F16H 2061/022; F16H 63/40
See application file for complete search history.

(56) References Cited

U.S. PATENT DOCUMENTS

| | | | |
|---|---|---|---|
| 6,107,761 A | 8/2000 | Seto et al. | |
| 6,691,011 B1* | 2/2004 | Jacobs | F16H 59/14 477/115 |
| 10,458,541 B1* | 10/2019 | Yu | F16H 61/18 |
| 2003/0036836 A1* | 2/2003 | Miller | B60K 31/16 701/54 |
| 2010/0185370 A1* | 7/2010 | Wurthner | F16H 61/0213 701/61 |
| 2012/0083980 A1* | 4/2012 | Kresse | F16H 61/0213 701/56 |
| 2012/0239588 A1* | 9/2012 | Sujan | G06Q 10/08355 705/338 |
| 2017/0037959 A1* | 2/2017 | Pflueger | F16H 61/0213 |
| 2017/0197624 A1* | 7/2017 | Omran | B60K 17/28 |
| 2018/0197355 A1* | 7/2018 | Remboski | G07C 5/0808 |

FOREIGN PATENT DOCUMENTS

WO    2017012531 A1    1/2017

* cited by examiner

*Primary Examiner* — Tisha D Lewis
(74) *Attorney, Agent, or Firm* — Ralph E Smith

(57) ABSTRACT

Gear position estimation techniques for a manual transmission of a vehicle include estimating a gear ratio of the manual transmission based on measured speeds of the vehicle and its torque generating system and when the estimated gear ratio is not within a threshold amount from any known gear ratios of the manual transmission, detecting at least two gear shifts of the manual transmission and determining a set of possible axle/tire ratios each indicative of a ratio of an axle ratio of the vehicle to a tire circumference of the vehicle after each gear shift, wherein each set includes values based on the measured torque generating system and vehicle speeds and each of the known gear ratios of the manual transmission, selecting and utilizing one of the possible axle/tire ratios that is common across all of the sets of possible axle/tire ratios.

16 Claims, 2 Drawing Sheets

SYSTEMS AND METHODS TO ESTIMATE THE GEAR POSITIONS OF MANUAL TRANSMISSIONS

FIELD

The present application generally relates to manual transmissions and, more particularly, to systems and methods to estimate the gear positions of manual transmissions.

BACKGROUND

A manual transmission of a vehicle is configured to be manually shifted by a driver of the vehicle into one of a plurality of gears. Each gear has a gear ratio indicative of a ratio of an input speed (e.g., a speed of a torque generating system of the vehicle, such as an engine, an electric motor, or a combination thereof) to an output speed (e.g., a speed of a driveline of the vehicle). A gear position sensor could be utilized to measure the gear position of the manual transmission, but this increases vehicle costs. Sensorless manual transmission gear position estimation techniques exist, but these techniques could fail in certain scenarios. For example, the driver could change an axle and/or sets of tires of the vehicle, which could render stored axle ratio and/or tire circumferences (e.g., measured and stored at the end of vehicle production) invalid for manual transmission gear position estimation. Accordingly, while these sensorless gear position estimation systems do work well for their intended purpose, there remains a need for improvement in the relevant art.

SUMMARY

According to one example aspect of the invention, a gear position estimation system for a manual transmission of a vehicle is presented. In one exemplary implementation, the gear position estimation system comprises: a set of sensors configured to measure a speed of a torque generating system of the vehicle and a speed of the vehicle and a controller configured to perform an axle/tire ratio determination procedure comprising: estimating a gear ratio of the manual transmission based the measured torque generating system and vehicle speeds and when the estimated gear ratio is not within a threshold amount from any of N known gear ratios of the manual transmission: detecting at least two gear shifts of the manual transmission, after each of the at least two gear shifts of the manual transmission, determining a set of possible axle/tire ratios each indicative of a ratio of an axle ratio of the vehicle to a tire circumference of the vehicle, wherein each set comprises values based on the measured torque generating system and vehicle speeds and each of the N known gear ratios of the manual transmission, selecting one of the possible axle/tire ratios that is common across all of the sets of possible axle/tire ratios to obtain a selected axle/tire ratio, and utilizing the selected axle/tire ratio to estimate the gear ratio of the manual transmission.

In some implementations, the controller is configured to perform the axle/tire ratio determination procedure at a start of every driving cycle of the vehicle. In some implementations, the gear position estimation system further comprises a non-volatile memory (NVM) configured to store a stored axle/tire ratio of the vehicle and the axle/tire ratio determination procedure further comprises: retrieving the stored axle/tire ratio, utilizing the stored axle/tire ratio to estimate the gear ratio of the manual transmission, when the estimated gear ratio is within the threshold amount from one of the N known gear ratios of the manual transmission, continue using the stored axle/tire ratio for estimation of the gear position of the manual transmission, and when the estimated gear ratio is not within the threshold amount from any of the N known gear ratios of the manual transmission, obtaining the selected axle/tire ratio and overwriting the stored axle/tire ratio at the NVM with the selected axle/tire ratio.

In some implementations, the controller is configured to perform gear position estimation of the manual transmission using the selected axle/tire ratio to improve vehicle drivability. In some implementations, the axle/tire ratio determination procedure comprises detecting three gear shifts of the manual transmission and determining sets of possible axle/tire ratios in between each of the three gear shifts to improve robustness. In some implementations, the vehicle does not comprise a gear position sensor for the manual transmission. In some implementations, the torque generating system comprises an engine, and wherein the set of sensors comprises an engine speed sensor configured to measure a speed of the engine and a vehicle speed sensor configured to measure a speed of the vehicle. In some implementations, N equals six or seven.

According to another example aspect of the invention, a gear position estimation method for a manual transmission of a vehicle is presented. In one exemplary implementation, the gear position estimation method comprises: receiving, by a controller of the vehicle and from a set of sensors, measured speeds of a torque generating system of the vehicle and the vehicle and performing, by the controller, an axle/tire ratio determination procedure comprising: estimating a gear ratio of the manual transmission based on the measured speeds of the torque generating system and the vehicle and when the estimated gear ratio is not within a threshold amount from any of N known gear ratios of the manual transmission: detecting at least two gear shifts of the manual transmission, after each of the at least two gear shifts of the manual transmission, determining a set of possible axle/tire ratios each indicative of a ratio of an axle ratio of the vehicle to a tire circumference of the vehicle, wherein each set comprises values based on the measured torque generating system and vehicle speeds and each of the N known gear ratios of the manual transmission, selecting one of the possible axle/tire ratios that is common across all of the sets of possible axle/tire ratios to obtain a selected axle/tire ratio, and utilizing the selected axle/tire ratio to estimate the gear ratio of the manual transmission.

In some implementations, the method further comprises performing, by the controller, the axle/tire ratio determination procedure at a start of every driving cycle of the vehicle. In some implementations, the axle/tire ratio determination procedure further comprises: retrieving, by the controller and from an NVM, the stored axle/tire ratio, utilizing, by the controller, the stored axle/tire ratio to estimate the gear ratio of the manual transmission when the estimated gear ratio is within the threshold amount from one of the N known gear ratios of the manual transmission, continue using, by the controller, the stored axle/tire ratio for estimation of the gear position of the manual transmission, and when the estimated gear ratio is not within the threshold amount from any of the N known gear ratios of the manual transmission, obtaining, by the controller, the selected axle/tire ratio and overwriting, by the controller and at the NVM, the stored axle/tire ratio with the selected axle/tire ratio.

In some implementations, the method further comprises performing, by the controller, gear position estimation of the manual transmission using the selected axle/tire ratio to improve vehicle drivability. In some implementations, the axle/tire ratio determination procedure further comprises detecting, by the controller, three gear shifts of the manual transmission and determining, by the controller, sets of possible axle/tire ratios in between each of the three gear shifts to improve robustness. In some implementations, the vehicle does not comprise a gear position sensor for the manual transmission. In some implementations, the torque generating system comprises an engine, and wherein the set of sensors comprises an engine speed sensor configured to measure a speed of engine and a vehicle speed sensor configured to measure a speed of the vehicle. In some implementations, N equals six or seven.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
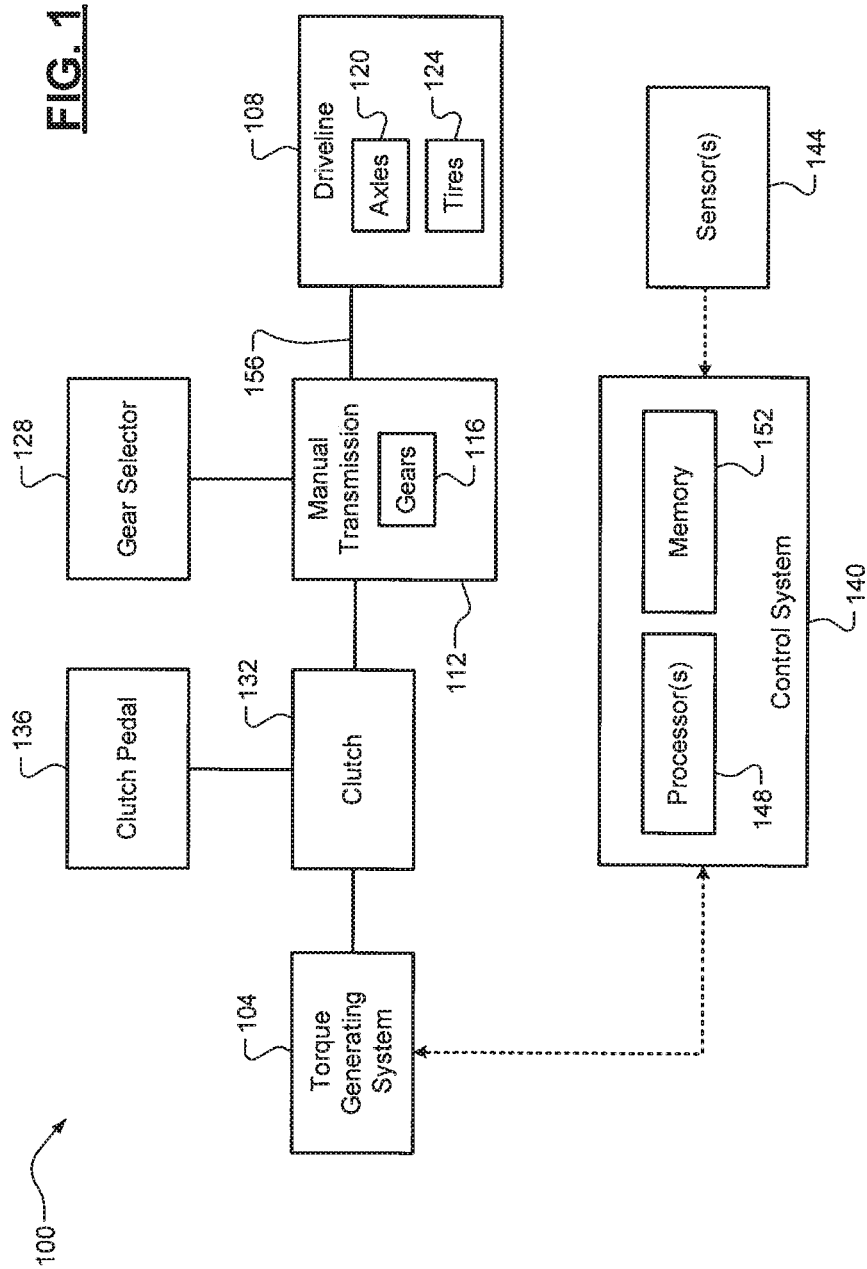
FIG. 1 is a functional block diagram of an example vehicle having a manual transmission and a gear position estimation system according to the principles of the present disclosure.

Referring now to FIG. 1, a functional block diagram of an example manual transmission vehicle 100 having a gear position estimation system according to the principles of the present disclosure is illustrated. The vehicle 100 comprises a torque generating system (e.g., an engine, an electric motor, or combinations thereof) that generates drive torque in response to a torque request (e.g., provided by a driver of the vehicle 100 via an accelerator pedal, not shown). The drive torque generated by the torque generating system 104 is selectively transferred to a driveline 108 of the vehicle 100 via a manual transmission 112 comprising N gears 116. For example only, N could be 6 or 7, but it will be appreciated that the manual transmission 112 could comprise any integer number of gears 116 greater than one. Each of the N gears 116 has a different gear ratio for transferring the drive torque from the torque generating system 104 to the driveline 108, which further comprises axles 120 and tires 124. It will be appreciated that the driveline 108 could further include other non-illustrated components (wheels, differentials, transfer cases, etc.).

A selected gear of the manual transmission 112 is manipulated by the driver of the vehicle 100 using a gear selector 128 (e.g., a shift lever operable to move through a fork pattern). The driver of the vehicle 100 also selectively engages and disengages the manual transmission 112 to the torque generating system 104 via a clutch 132 that is controlled by the driver using a clutch pedal 136 or other suitable clutch control device. It will be appreciated that the vehicle 100 or the manual transmission 112 could comprise other devices that are not illustrated, such as a flywheel and a synchromesh. A control system 140 (also referred to as a "gear position estimation system") controls operation of the vehicle 100, including controlling the torque generating system 104 to generate a desired amount of drive torque. The control system 140 receives inputs from a set of one or more sensor(s) 144, including, but not limited to, a torque generating system speed sensor (e.g., an engine speed sensor) and a vehicle speed sensor. The control system 140 comprises one or more processors 148 and a memory 152 (e.g., a nonvolatile memory, or NVM), although it will be appreciated that the memory 152 could be located external to the control system 140.

The memory 152 stores, among other data, a ratio of (i) a ratio of revolutions of an output shaft 156 of the transmission 112 to revolutions of the axles 120 (also known as an "axle ratio" or "drive-axle ratio" of the vehicle 100) to (ii) a circumference of the tires 124. This ratio of the vehicle axle ratio to its tire circumference is hereinafter referred to herein as an "axle/tire ratio." This axle/tire ratio is initially determined and stored in the memory 152 upon completion of the build of the vehicle 100. As previously mentioned herein, however, the driver of the vehicle 100 may change the axles 120 and/or the tires 124 over time. For example only, the driver could increase the size of the axles 120 and/or the tires 124 for purposes of improved off-road driving performance. Thus, the stored axle/tire ratio could become inaccurate over time. The axle/tire ratio, however, is a critical parameter for sensorless estimation of the position of the manual transmission 112 (i.e., what is the current gear of the manual transmission 112). Without an accurate value of the axle/tire ratio, vehicle drivability (e.g., noise/vibration/harshness) would be negatively affected. One solution to this is a gear position sensor for the manual transmission 112, but this increases costs.

Figure 2:
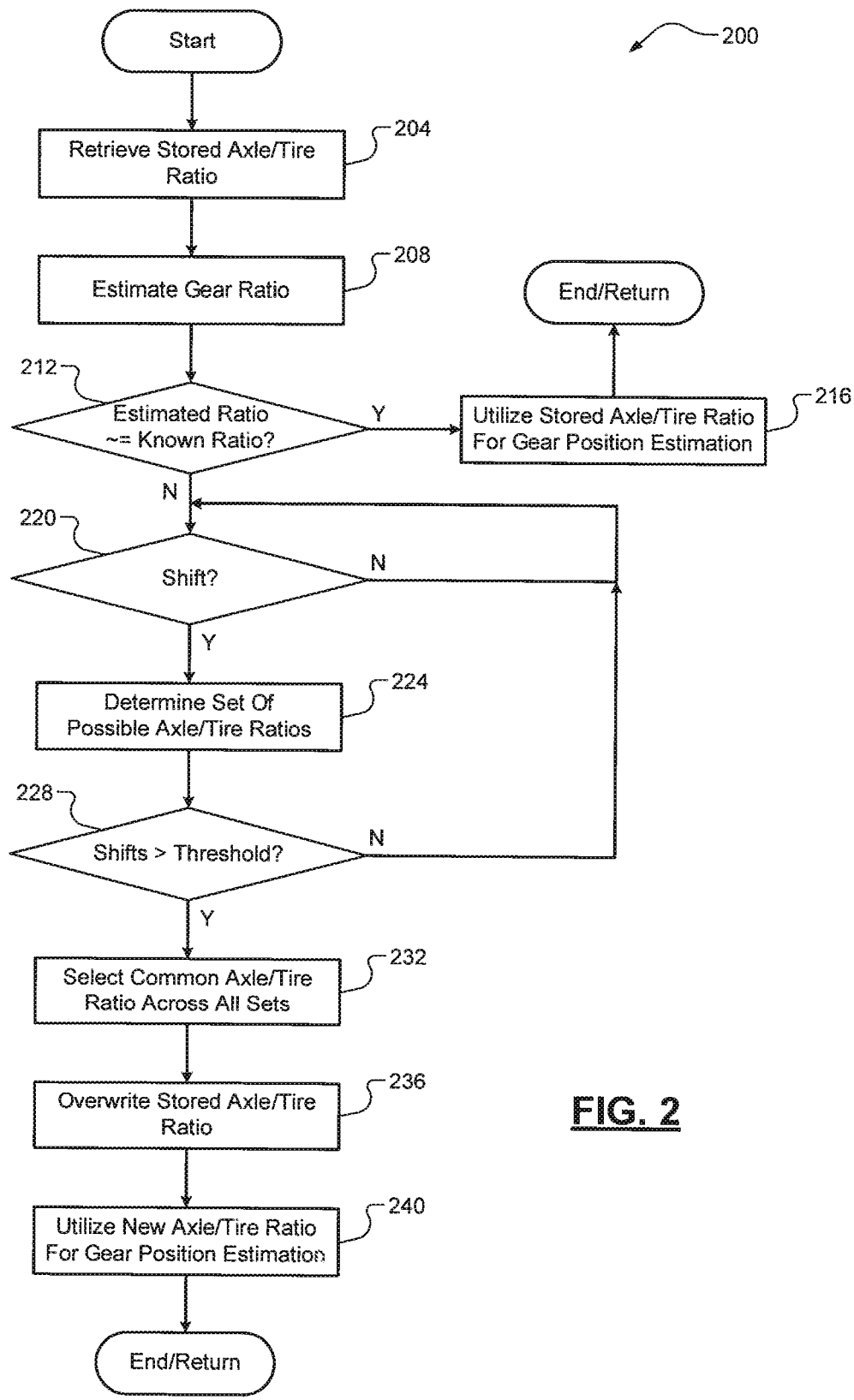
FIG. 2 is a flow diagram of an example gear position estimation method for a manual transmission of a vehicle according to the principles of the present disclosure.

Accordingly, the control system 140 (also referred to herein as a "gear position estimation system") is configured to continuously validate and, if necessary, relearn the axle/tire ratio over time. It will be appreciated that an NVM configuration of the memory 152 is not necessary. In such configurations, no validation of a stored value and possible relearning would occur. Instead, the axle/tire ratio would just be learned upon the start of every driving cycle. Referring now to FIG. 2, a flow diagram of a gear position estimation method 200 is illustrated. At 204, the processor(s) 148 of the control system 140 retrieve the stored axle/tire ratio from the memory 152. At 208, the processor(s) 148 estimate a gear ratio of the manual transmission 112 based on a measured speed of the torque generating system and a measured speed of the vehicle 100 (e.g., from sensor(s) 144) and the retrieved axle/tire ratio. At 212, the processor(s) 148 determine whether the estimated gear ratio is within a calibratable threshold amount from one of the N known gear ratios of the manual transmission 112. When true, the method 200 proceeds to 216 where the processor(s) 148 continue gear position estimation of the manual transmission 112 using the stored axle/tire ratio in the memory 152. In other words, this means that the stored axle/tire ratio is accurate and validated for use in gear position estimation.

When the estimated gear ratio is not within the threshold amount from any of the N known gear ratios, however, the method 200 proceeds to 220. At 220, the processor(s) 148 detect whether a gear shift of the manual transmission 112 has occurred. When false, the method 200 returns to 220. When true, the method 200 proceeds to 224 where the processor(s) 148 determine a set of possible axle/tire ratios of the vehicle 100. Each set of possible axle/tire ratios comprises values based on the measured torque generating system and vehicle speeds (e.g., from sensor(s) 144) and each of the N known gear ratios of the manual transmission 112. At 228, the processor(s) 148 determine whether a threshold number of shifts of the manual transmission 112 have occurred. The threshold number of shifts should be at least two such that at least two sets of possible axle/tire ratios can be determined (i.e., one after each shift), It will be appreciated, however, that more shifts could be required (e.g., three) in order to increase the robustness of the axle/tire ratio determination.

When the threshold number of shifts have not occurred, the method 200 returns to 220 and the process continues (e.g., after each shift, determine a set of possible axle/tire ratios) until the threshold number of shifts have occurred. Once the threshold number of shifts have occurred, the method 200 proceeds to 232 where the processor(s) 148 select one of the possible axle/tire ratios that is common across all of the sets of possible axle/tire ratios. This common value represents the actual axle/tire ratio of the vehicle 100 because it is a valid value for multiple different gears ratios of the manual transmission 112. At 236, the processor(s) 148 command the memory 152 to overwrite the stored axle/tire ratio with the selected possible axle/tire ratio. Finally, at 240, the processor(s) 148 utilize the newly determined and stored axle/tire ratio for gear position estimation of the manual transmission 112. The method 200 then ends or returns to 204 for continuous validation of the stored axle/tire ratio and, if necessary, relearning of the axle/tire ratio.

It will be appreciated that the terms "controller" and "control system" as used herein refer to any suitable control device or set of multiple control devices that is/are configured to perform at least a portion of the techniques of the present disclosure. Non-limiting examples include an application-specific integrated circuit (ASIC), one or more processors (e.g., processor(s) 148) and a non-transitory memory (e.g., memory 152) having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A gear position estimation system for a manual transmission of a vehicle, the gear position estimation system comprising:
   a set of sensors configured to measure a speed of a torque generating system of the vehicle and a speed of the vehicle; and
   a controller configured to perform an axle/tire ratio determination procedure comprising:
      estimating a gear ratio of the manual transmission based on the measured torque generating system and vehicle speeds; and
      when the estimated gear ratio is not within a threshold amount from any known gear ratios of the manual transmission:
         detecting at least two gear shifts of the manual transmission,
         after each of the at least two gear shifts of the manual transmission, determining a set of possible axle/tire ratios each indicative of a ratio of an axle ratio of the vehicle to a tire circumference of the vehicle, wherein each set comprises values based on the measured torque generating system and vehicle speeds and each of the known gear ratios of the manual transmission,
         selecting one of the possible axle/tire ratios that is common across all of the sets of possible axle/tire ratios to obtain a selected axle/tire ratio, and
         utilizing the selected axle/tire ratio to estimate the gear ratio of the manual transmission.

2. The gear position estimation system of claim 1, wherein the controller is configured to perform the axle/tire ratio determination procedure at a start of every driving cycle of the vehicle.

3. The gear position estimation system of claim 1, further comprising a non-volatile memory (NVM) configured to store a stored axle/tire ratio of the vehicle, wherein the axle/tire ratio determination procedure further comprises:
   retrieving the stored axle/tire ratio;
   utilizing the stored axle/tire ratio to estimate the gear ratio of the manual transmission;
   when the estimated gear ratio is within the threshold amount from one of the known gear ratios of the manual transmission, continue using the stored axle/tire ratio for estimation of the gear position of the manual transmission; and
   when the estimated gear ratio is not within the threshold amount from any of the known gear ratios of the manual transmission, obtaining the selected axle/tire ratio and overwriting the stored axle/tire ratio at the NVM with the selected axle/tire ratio.

4. The gear position estimation system of claim 1, wherein the controller is configured to perform gear position estimation of the manual transmission using the selected axle/tire ratio to improve vehicle drivability.

5. The gear position estimation system of claim 1, wherein the axle/tire ratio determination procedure comprises detecting three gear shifts of the manual transmission and determining sets of possible axle/tire ratios in between each of the three gear shifts to improve robustness.

6. The gear position estimation system of claim 1, wherein the vehicle does not comprise a gear position sensor for the manual transmission.

7. The gear position estimation system of claim 1, wherein the torque generating system comprises an engine, and wherein the set of sensors comprises an engine speed sensor configured to measure a speed of the engine and a vehicle speed sensor configured to measure a speed of the vehicle.

8. The gear position estimation system of claim 1, wherein the manual transmission has six or seven known gear ratios.

9. A gear position estimation method for a manual transmission of a vehicle, the gear position estimation method comprising:
   receiving, by a controller of the vehicle and from a set of sensors, measured speeds of a torque generating system of the vehicle and the vehicle; and
   performing, by the controller, an axle/tire ratio determination procedure comprising:
      estimating a gear ratio of the manual transmission based on the measured speeds of the torque generating system and the vehicle; and when the estimated gear ratio is not within a threshold amount from any known gear ratios of the manual transmission:
  detecting at least two gear shifts of the manual transmission,
  after each of the at least two gear shifts of the manual transmission, determining a set of possible axle/tire ratios each indicative of a ratio of an axle ratio of the vehicle to a tire circumference of the vehicle, wherein each set comprises values based on the measured torque generating system and vehicle speeds and each of the known gear ratios of the manual transmission,
  selecting one of the possible axle/tire ratios that is common across all of the sets of possible axle/tire ratios to obtain a selected axle/tire ratio, and
  utilizing the selected axle/tire ratio to estimate the gear ratio of the manual transmission.

10. The gear position estimation method of claim 9, further comprising performing, by the controller, the axle/tire ratio determination procedure at a start of every driving cycle of the vehicle.

11. The gear position estimation method of claim 9, wherein the axle/tire ratio determination procedure further comprises:
  retrieving, by the controller and from a non-volatile memory (NVM) the stored axle/tire ratio;
  utilizing, by the controller, the stored axle/tire ratio to estimate the gear ratio of the manual transmission;
  when the estimated gear ratio is within the threshold amount from one of the known gear ratios of the manual transmission, continue using, by the controller, the stored axle/tire ratio for estimation of the gear position of the manual transmission; and
  when the estimated gear ratio is not within the threshold amount from any of the known gear ratios of the manual transmission, obtaining, by the controller, the selected axle/tire ratio and overwriting, by the controller and at the NVM, the stored axle/tire ratio with the selected axle/tire ratio.

12. The gear position estimation method of claim 9, further comprising performing, by the controller, gear position estimation of the manual transmission using the selected axle/tire ratio to improve vehicle drivability.

13. The gear position estimation method of claim 9, wherein the axle/tire ratio determination procedure further comprises detecting, by the controller, three gear shifts of the manual transmission and determining, by the controller, sets of possible axle/tire ratios in between each of the three gear shifts to improve robustness.

14. The gear position estimation method of claim 9, wherein the vehicle does not comprise a gear position sensor for the manual transmission.

15. The gear position estimation method of claim 9, wherein the torque generating system comprises an engine, and wherein the set of sensors comprises an engine speed sensor configured to measure a speed of engine and a vehicle speed sensor configured to measure a speed of the vehicle.

16. The gear position estimation method of claim 9, wherein the manual transmission has six or seven known gear ratios.

* * * * *